United States Patent
Abeygunawardana et al.

(10) Patent No.: US 11,771,027 B2
(45) Date of Patent: Oct. 3, 2023

(54) OVERFLOW PROTECTION SYSTEM FOR A HYDRATION SYSTEM IN AN INDOOR GARDENING APPLIANCE

(71) Applicant: Haier US Appliance Solutions, Inc., Wilmington, DE (US)

(72) Inventors: Danister Abeygunawardana, Jeffersonville, IN (US); Jianwu Li, Louisville, KY (US); Eric Meyerholtz, Evansville, IN (US); Brent Alden Junge, Evansville, IN (US); Venkata Ratna Ganesh Kallakuri, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/569,773

(22) Filed: Jan. 6, 2022

(65) Prior Publication Data
US 2023/0210070 A1 Jul. 6, 2023

(51) Int. Cl.
*A01G 31/04* (2006.01)
*A01G 31/00* (2018.01)

(52) U.S. Cl.
CPC ........ *A01G 31/04* (2013.01); *A01G 2031/006* (2013.01)

(58) Field of Classification Search
CPC . A01G 31/04; A01G 9/00; A01G 9/02; A01G 9/021; A01G 9/022; A01G 2031/006
See application file for complete search history.

(56) References Cited

U.S. PATENT DOCUMENTS

| | | | | |
|---|---|---|---|---|
| 2,928,211 | A * | 3/1960 | Martin | A01G 31/06 47/60 |
| 3,323,253 | A | 6/1967 | Robins | |
| D309,122 | S * | 7/1990 | Biemolt | D15/144.1 |
| 5,101,593 | A * | 4/1992 | Bhatt | A01G 9/243 47/61 |
| 7,143,544 | B2 * | 12/2006 | Roy | A01G 31/02 47/60 |
| 9,807,949 | B2 | 11/2017 | Hamlin | |
| 9,936,650 | B2 * | 4/2018 | Palmieri, Jr. | A01G 9/246 |
| 10,136,594 | B2 | 11/2018 | Blank | |
| 10,321,696 | B2 * | 6/2019 | Wu | A01G 31/02 |

(Continued)

FOREIGN PATENT DOCUMENTS

| | | |
|---|---|---|
| KR | 101017272 B1 | 2/2011 |
| WO | WO2019222860 A1 | 11/2019 |
| WO | WO-2020142851 A1 * | 7/2020 ............. A01G 31/02 |

*Primary Examiner* — Monica L Perry
*Assistant Examiner* — Aaron M Rodziwicz
(74) *Attorney, Agent, or Firm* — Dority & Manning, P.A.

(57) ABSTRACT

A gardening appliance includes a grow tower rotatably mounted within a liner and defining a root chamber. A mixing tank defines a water inlet, a nutrient inlet, and a mixture outlet. An overflow protection system is operably coupled to the mixing tank and includes a wastewater reservoir, an overflow port fluidly coupled to the mixing tank, an overflow conduit providing fluid communication between the overflow port and the wastewater reservoir, and a one-way overflow valve fluidly coupled to the overflow conduit to prevent liquid flow back into the mixing tank.

20 Claims, 14 Drawing Sheets

(56) References Cited

U.S. PATENT DOCUMENTS

| | | | |
|---|---|---|---|
| 10,499,574 B2* | 12/2019 | Lu | G08B 21/18 |
| 11,039,585 B1* | 6/2021 | Huntzinger | A01G 31/06 |
| 11,064,659 B2* | 7/2021 | Loessl | A01G 9/00 |
| 11,071,267 B2* | 7/2021 | Kondorf | A01G 9/022 |
| 11,154,020 B2* | 10/2021 | Loessl | A01C 23/042 |
| 2015/0313095 A1* | 11/2015 | Fenner, Jr. | A01G 7/045 |
| | | | 47/84 |
| 2017/0066587 A1* | 3/2017 | Fenner, Jr. | A01G 9/249 |
| 2021/0084834 A1* | 3/2021 | Hunter | A01G 13/02 |
| 2021/0084836 A1* | 3/2021 | Hunter | A01G 9/16 |
| 2021/0224979 A1* | 7/2021 | Hunter | G06T 7/62 |
| 2022/0174898 A1* | 6/2022 | Allgeier | A01G 9/023 |
| 2022/0408671 A1* | 12/2022 | Vijayan | A01G 9/246 |

\* cited by examiner

OVERFLOW PROTECTION SYSTEM FOR A HYDRATION SYSTEM IN AN INDOOR GARDENING APPLIANCE

FIELD OF THE INVENTION

The present subject matter relates generally to systems for gardening plants indoors, and more particularly, to hydration assemblies for use within gardening appliances and systems for preventing overflows and leaks from such hydration assemblies.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a hydration system for providing a flow of water and nutrients onto plants stored therein to facilitate plant growth. For example, typical garden centers have a nozzle that sprays liquid onto roots within a root chamber of a grow module or otherwise charges the entire root chamber with a hydrating mist. Such hydration systems typically include a mixing tank fluidly coupled to a water supply and a nutrient dosing system for generating a nutrient mixture. Nutrients and water may be mixed within the mixing tanks before a pump urges the mixture to a discharge nozzle to hydrate plants. However, clogs may be common in gardening appliance hydration systems, e.g., due to buildup of plant deposits, agglomeration of nutrients, development of mold, mildew, or grime, etc. When these clogs occur, this may result in an excessive amount of liquid or increased pressures in the mixing tank, which may in turn result in leaks that can escape from the appliance and damage furniture, flooring, or other items.

Accordingly, an improved indoor garden center would be useful. More particularly, an indoor garden center with a hydration system that facilitates improved hydration while minimizing the risk of overflows or leaks would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided. The gardening appliance includes a liner positioned within a cabinet and defining a grow chamber, a grow tower rotatably mounted within the liner, the grow tower defining a root chamber and a plurality of apertures for receiving one or more plant pods, a mixing tank for making a nutrient mixture, the mixing tank defining a water inlet, a nutrient inlet, and a mixture outlet, and an overflow protection system operably coupled to the mixing tank. The overflow protection system includes a wastewater reservoir, an overflow port fluidly coupled to the mixing tank, an overflow conduit providing fluid communication between the overflow port and the wastewater reservoir, and a one-way overflow valve fluidly coupled to the overflow conduit to prevent liquid flow back into the mixing tank.

In another exemplary embodiment, a hydration system for a gardening appliance is provided. The gardening appliance includes a liner positioned within a cabinet and defining a grow chamber, and a grow tower rotatably mounted within the liner and defining a root chamber. The hydration system includes one or more discharge nozzles positioned within the root chamber, a mixing tank for making a nutrient mixture, the mixing tank defining a water inlet, a plurality of nutrient inlets, and a mixture outlet, a water supply for providing a flow of water into the mixing tank, a nutrient dosing system comprising a plurality of nutrient cartridges fluidly coupled to the mixing tank through the plurality of nutrient inlets, a pump assembly fluidly coupled to the mixture outlet for urging the nutrient mixture from the mixing tank into the one or more discharge nozzles, and an overflow protection system operably coupled to the mixing tank. The overflow protection system includes a wastewater reservoir, an overflow port fluidly coupled to the mixing tank, an overflow conduit providing fluid communication between the overflow port and the wastewater reservoir, and a one-way overflow valve fluidly coupled to the overflow conduit to prevent liquid flow back into the mixing tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
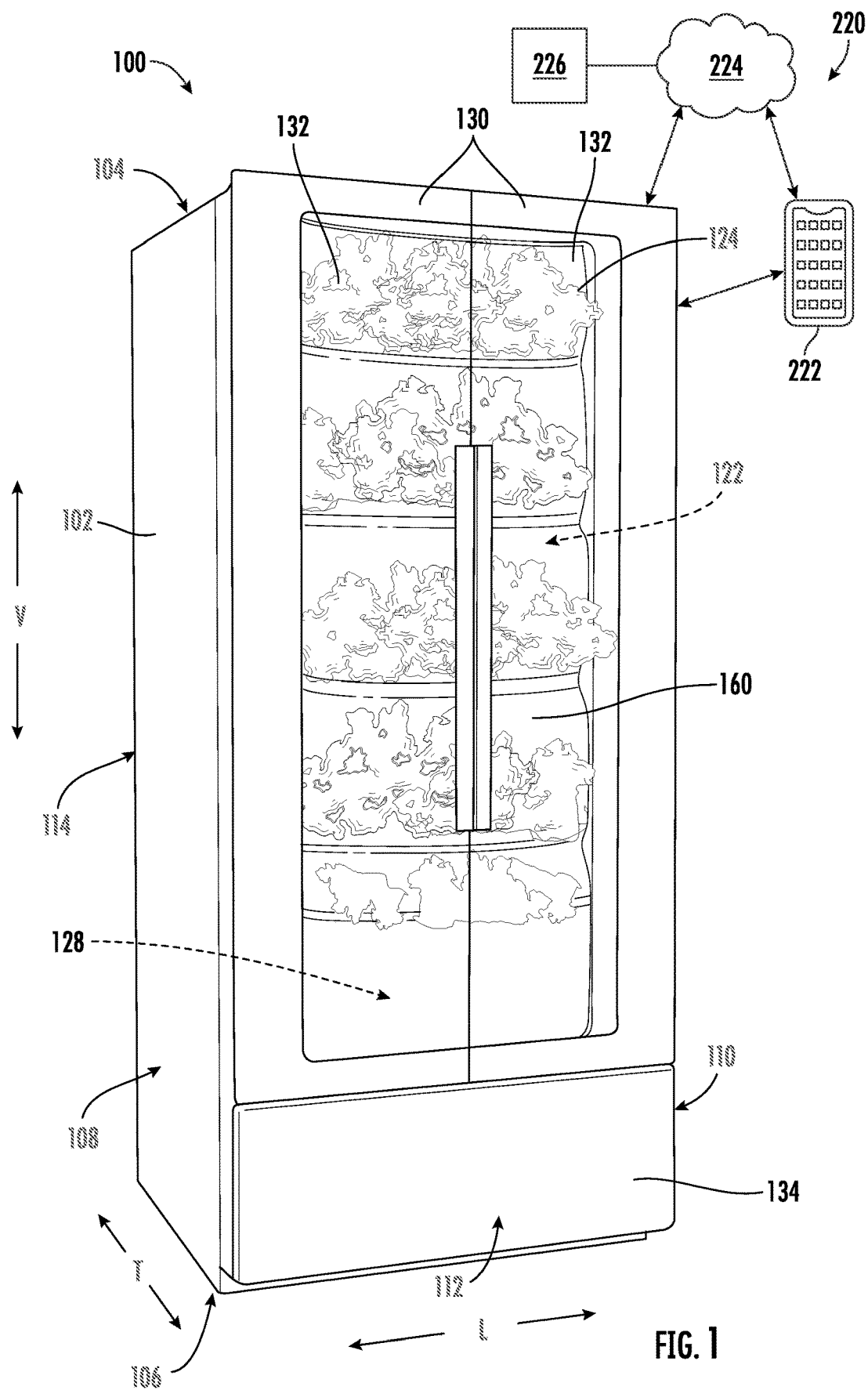
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
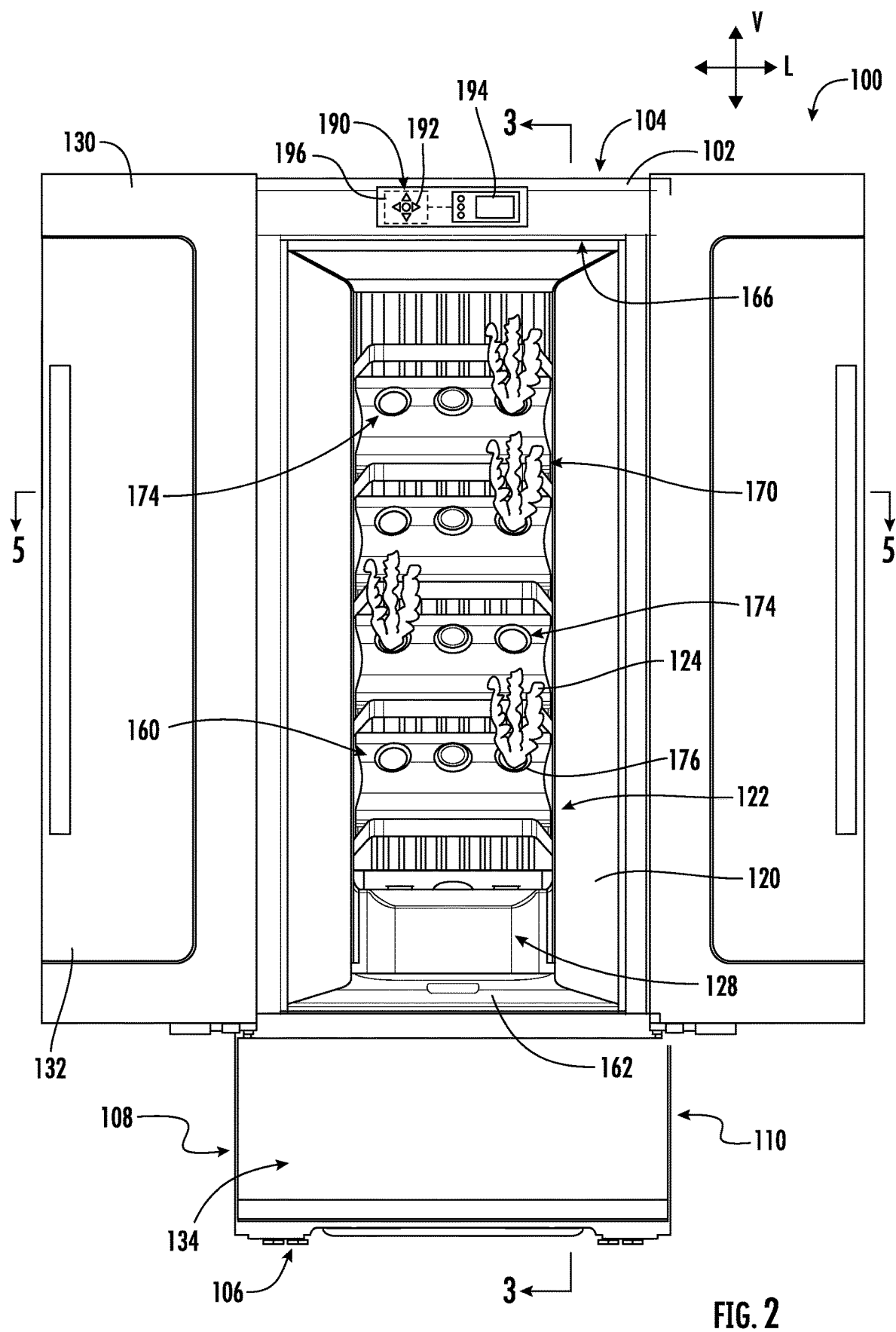
FIG. 2 depicts a front view of the exemplary gardening appliance of FIG. 1 with the doors open according to an exemplary embodiment of the present subject matter.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
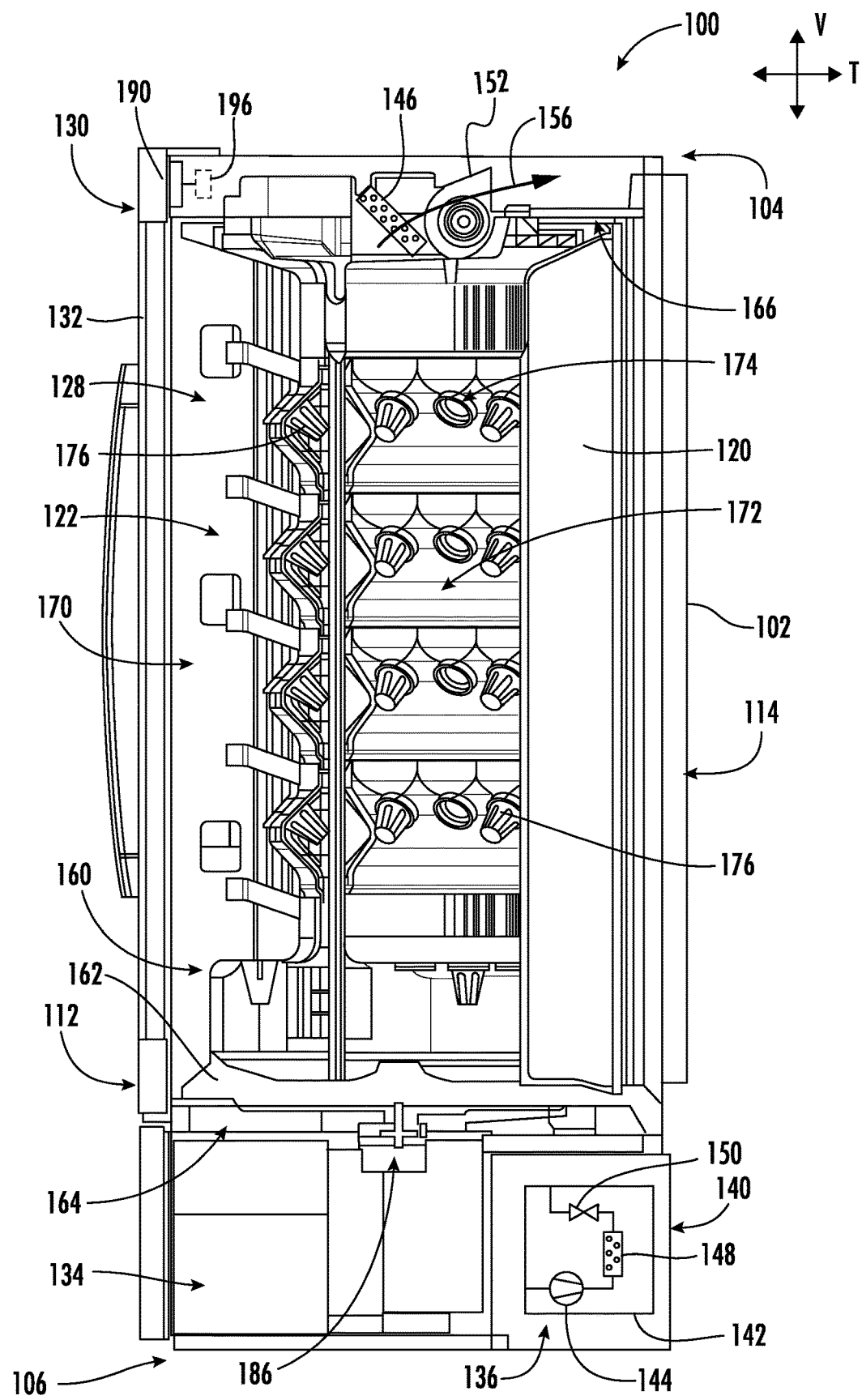
FIG. 3 is a cross sectional view of the exemplary gardening appliance of FIG. 1, taken along Line 3-3 from FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170. In addition, according to the illustrated embodiment, root chamber 172 may be operably coupled with sealed system 142 for facilitating suitable climate control within the root chamber 172, e.g., to achieve desirable growing conditions.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
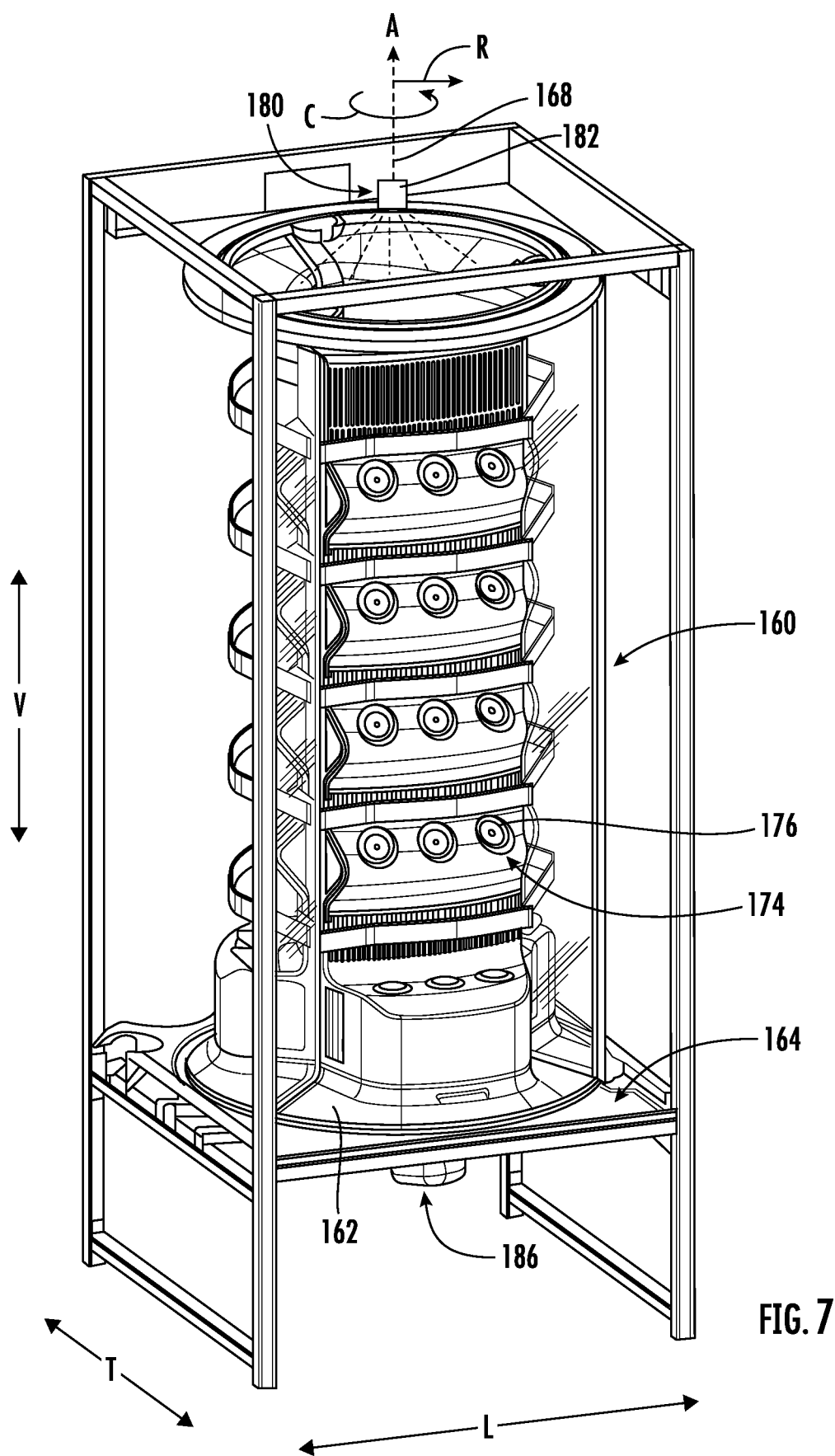
FIG. 7 provides a perspective view of a grow tower of the exemplary gardening appliance of FIG. 1 according to an exemplary embodiment of the present subject matter.

As best shown in FIG. 7, environmental control system 140 may further include a hydration system 180 which is generally configured for providing water and/or nutrients to plants 124 to support their growth. Specifically, according to the illustrated embodiment, hydration system 180 may be fluidly coupled to a water supply and or nutrient distribution assembly to selectively provide desirable quantities and concentrations of hydration, nutrients, and/or other fluids onto plants 124 to facilitate improved plant growth. For example, hydration system 180 includes misting device 182 (e.g., such as a fine mist spray nozzle or nozzles) that is fluidly coupled to a water supply (not shown). For example, the water supply may be a reservoir containing water (e.g., distilled water) or may be a direct connection municipal water supply. According to exemplary embodiments, hydration system 180 may include one or more pumps (not shown) for providing a flow of liquid nutrients to misting device 182. In this regard, for example, water or nutrients that are not absorbed by roots of plants 124 may fall under the force of gravity into sump 164 and these pumps may be fluidly coupled to sump 164 to recirculate the water through misting device 182.

According to the illustrated embodiment, misting device 182 is positioned at a top of root chamber 172 and may be configured for charging root chamber 172 with mist for hydrating the roots of plants 124. Alternatively, misting devices 182 may be positioned at a bottom of root chamber 172 (e.g., within sump 164) for spraying a mist or water into root chamber 172. Because various plants 124 may require different amounts of water for desired growth, hydration system 180 may alternatively include a plurality of misting devices 182, e.g., all coupled to the water supply and/or nutrient supplies. This plurality of misting devices 182 may be spaced apart at along the vertical direction V within root chamber 172. In this manner, these misting devices 182 may provide different concentrations of hydration and/or nutrients to different regions within root chamber 172.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
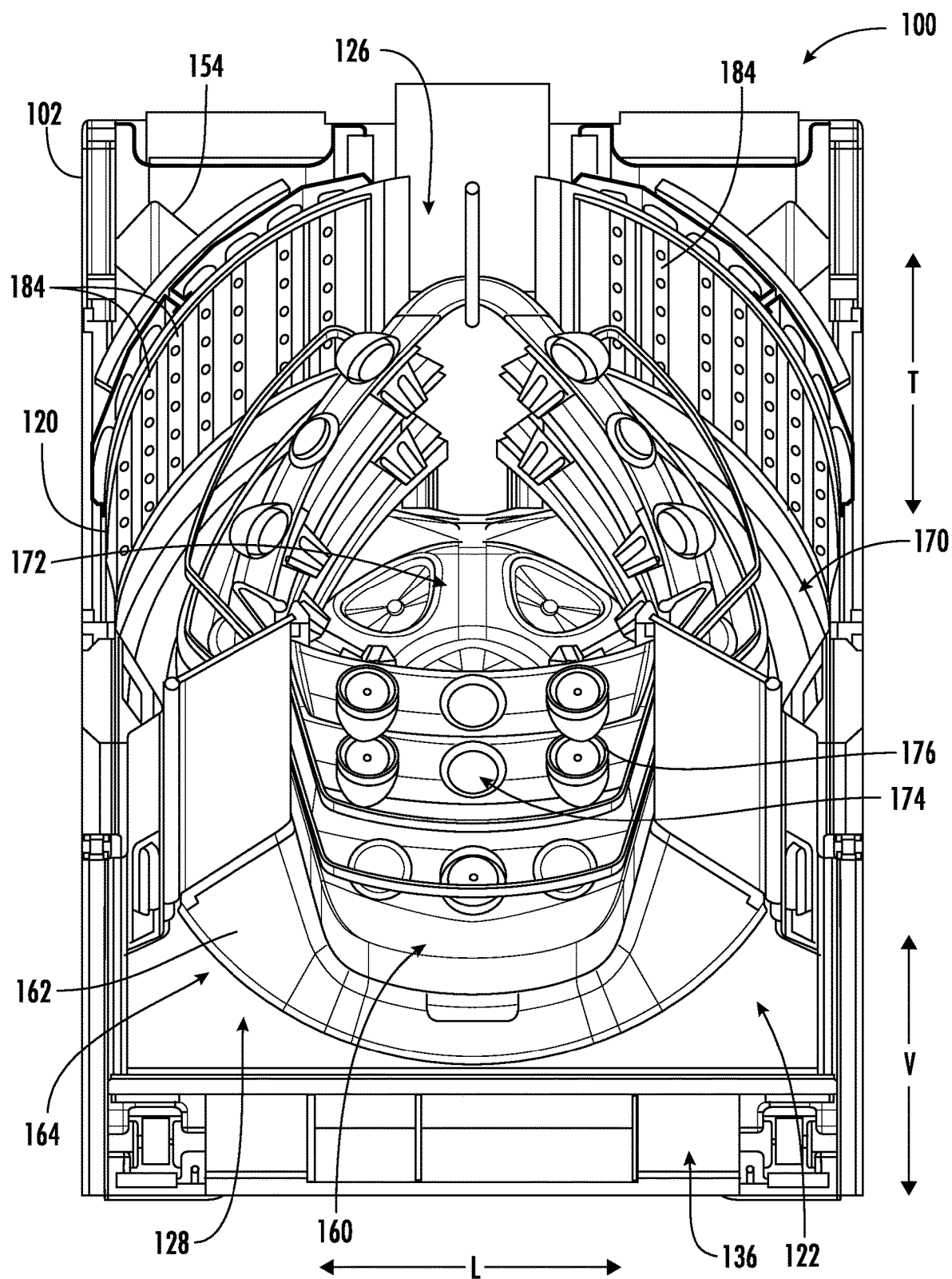
FIG. 5 is a perspective cross-sectional view of the exemplary gardening appliance of FIG. 1, taken along Line 5-5 from FIG. 2.
Figure 6:
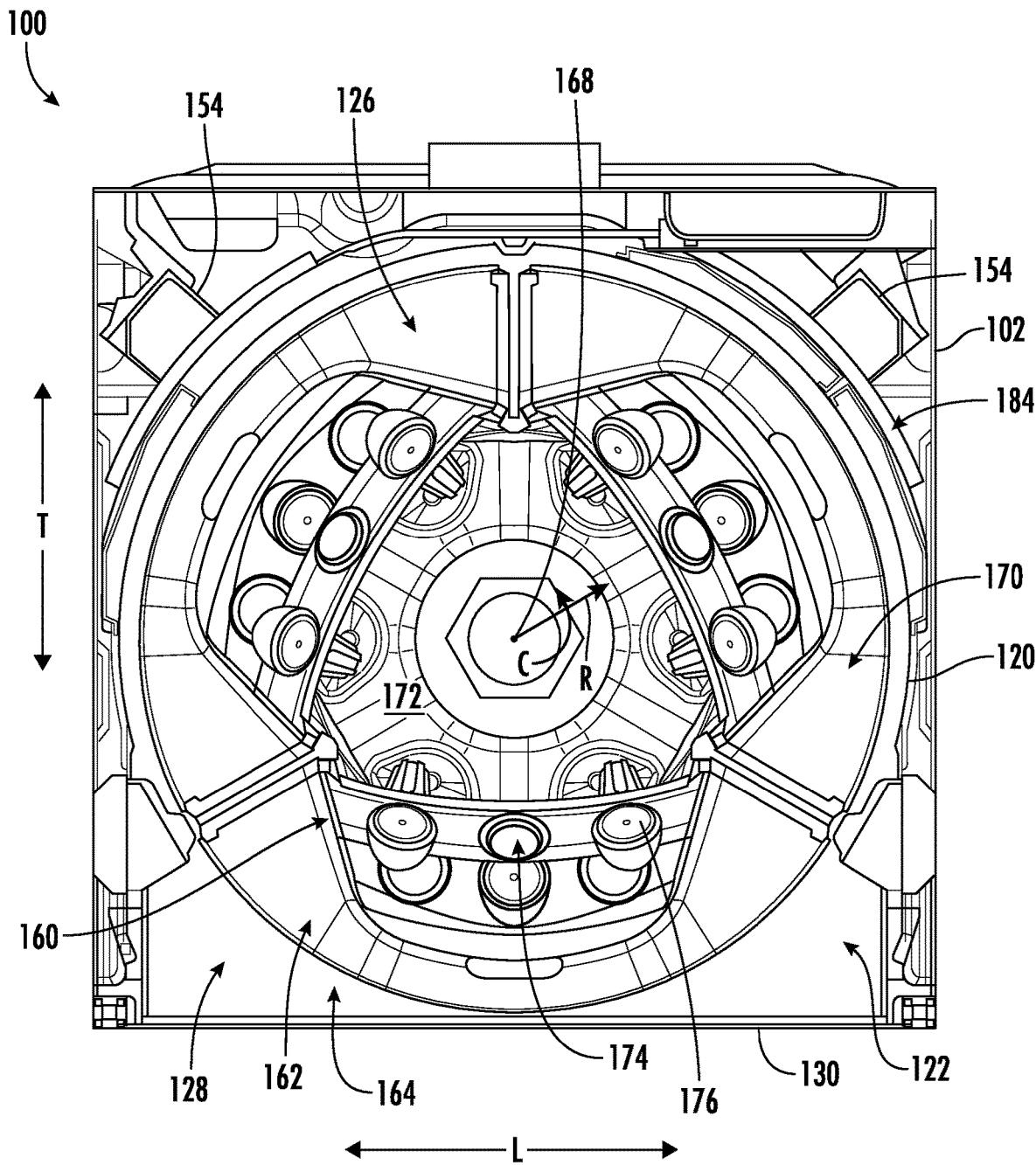
FIG. 6 is a top cross-sectional view of the exemplary gardening appliance of FIG. 1, taken along Line 5-5 from FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 196 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
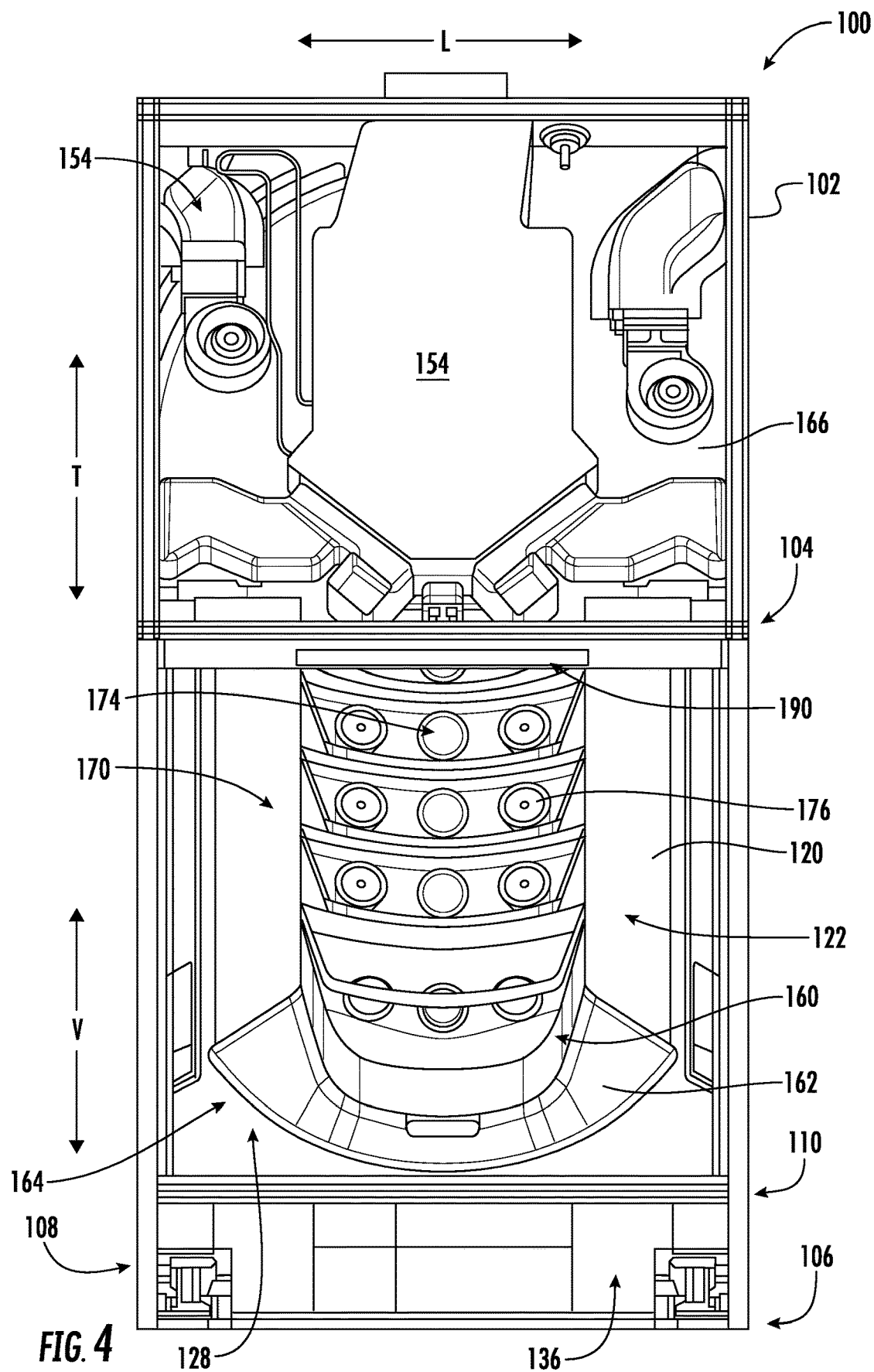
FIG. 4 is a top perspective view of the exemplary gardening appliance of FIG. 1, with a top panel and doors removed according to an exemplary embodiment of the present subject matter.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 180 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Referring again to FIG. 1, a schematic diagram of an external communication system 220 will be described according to an exemplary embodiment of the present subject matter. In general, external communication system 220 is configured for permitting interaction, data transfer, and other communications between gardening appliance 100 and one or more external devices. For example, this communication may be used to provide and receive operating parameters, user instructions or notifications, performance characteristics, user preferences, or any other suitable information for improved performance of gardening appliance 100. In addition, it should be appreciated that external communication system 220 may be used to transfer data or other information to improve performance of one or more external devices or appliances and/or improve user interaction with such devices.

For example, external communication system 220 permits controller 196 of gardening appliance 100 to communicate with a separate device external to gardening appliance 100, referred to generally herein as an external device 222. As described in more detail below, these communications may be facilitated using a wired or wireless connection, such as via a network 224. In general, external device 222 may be any suitable device separate from gardening appliance 100 that is configured to provide and/or receive communications, information, data, or commands from a user. In this regard, external device 222 may be, for example, a personal phone, a smartphone, a tablet, a laptop or personal computer, a wearable device, a smart home system, or another mobile or remote device.

In addition, a remote server 226 may be in communication with gardening appliance 100 and/or external device 222 through network 224. In this regard, for example, remote server 226 may be a cloud-based server 226, and is thus located at a distant location, such as in a separate state, country, etc. According to an exemplary embodiment, external device 222 may communicate with a remote server 226 over network 224, such as the Internet, to transmit/receive data or information, provide user inputs, receive user notifications or instructions, interact with or control gardening appliance 100, etc. In addition, external device 222 and remote server 226 may communicate with gardening appliance 100 to communicate similar information.

In general, communication between gardening appliance 100, external device 222, remote server 226, and/or other user devices or appliances may be carried using any type of wired or wireless connection and using any suitable type of communication network, non-limiting examples of which are provided below. For example, external device 222 may be in direct or indirect communication with gardening appliance 100 through any suitable wired or wireless communication connections or interfaces, such as network 224. For example, network 224 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 220 is described herein according to an exemplary embodiment of the present subject matter. However, it should be appreciated that the exemplary functions and configurations of external communication system 220 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now generally to FIGS. 8 through 14, gardening appliance 100 may further include a hydration system 300 that is generally configured for hydrating plants 124 within gardening appliance 100. In this regard, for example, hydration system 300 may be a part of or may entirely replace a hydration system 180 described above, e.g., or may be used to provide nutrient mixture to misting nozzle(s) 182. Although an exemplary configuration and operation of hydration system 300 will be described below, it should be appreciated that variations and modifications may be made to such systems and methods while remaining within the scope of the present subject matter.

Although hydration system 300 is described herein as being used with gardening appliance 100, it should be appreciated that aspects of the present subject matter may be applied in any other suitable hydration system. For example, the hydration system 300 described herein may be used to treat untreated water or otherwise filter a liquid in any other suitable application, in any other suitable appliance, etc. In addition, variations and modifications may be made to the exemplary constructions described herein while remaining within the scope of the present subject matter.

According to the illustrated embodiment, hydration system 300 includes a pump assembly 302 that is fluidly coupled to a supply conduit 304 (see, e.g., FIG. 11) and is generally configured for providing a flow of water and/or other nutrients (e.g., referred to herein as a nutrient mixture) into root chamber 172 and/or climate-controlled chamber 122. Specifically, hydration system 300 further includes one or more discharge nozzles 308 that are in fluid communication with pump assembly 302. In this manner, pump assembly 302 may generally selectively provide the nutrient mixture through discharge nozzles 308 to hydrate plants 124. According to an exemplary embodiment, discharge nozzles 308 may be a part of or replace a hydration system 180 as illustrated in FIGS. 1 through 7. In this regard, discharge nozzle 308 may be equivalent to misting nozzle 182 or may be used in addition to misting nozzle 182. Although one exemplary configuration of discharge nozzles 308 is described herein, it should be appreciated that discharge nozzles 308 may include any other suitable number, type, configuration, and position of devices for supplying water, hydration, or other nutrients to plants 124.

According to exemplary embodiments, pump assembly 302 may include any suitable number and configuration of devices or mechanisms for selectively urging the nutrient mixture onto plants 124. For example, according to the illustrated embodiment, pump assembly 302 includes a circulation pump for selectively pressurizing and urging a nutrient mixture through supply conduit 304 and to discharge nozzles 308. In addition, hydration system 300 includes an accumulator 312 that is generally configured for receiving and storing pressurized water or liquid. In this regard, the term "accumulator" may generally be used to refer to any suitable device for receiving, storing, and distributing pressurized liquid. For example, accumulator 312 may be a sealed container containing an air bladder that is compressed as pressurized water is supplied into accumulator 312. The air within the air bladder may be compressed to maintain the pressure of the water within accumulator 312 and may expand to discharge water when the supply conduit 304 is no longer pressurized. In this manner, accumulator 312 may operate to absorb hydraulic disturbances and maintain a substantially constant pressure and flow rate for the nutrient mixture. It should be appreciated that other means for maintaining the hydraulic pressure within accumulator 312 may be used while remaining within the scope of the present subject matter.

Figure 14:
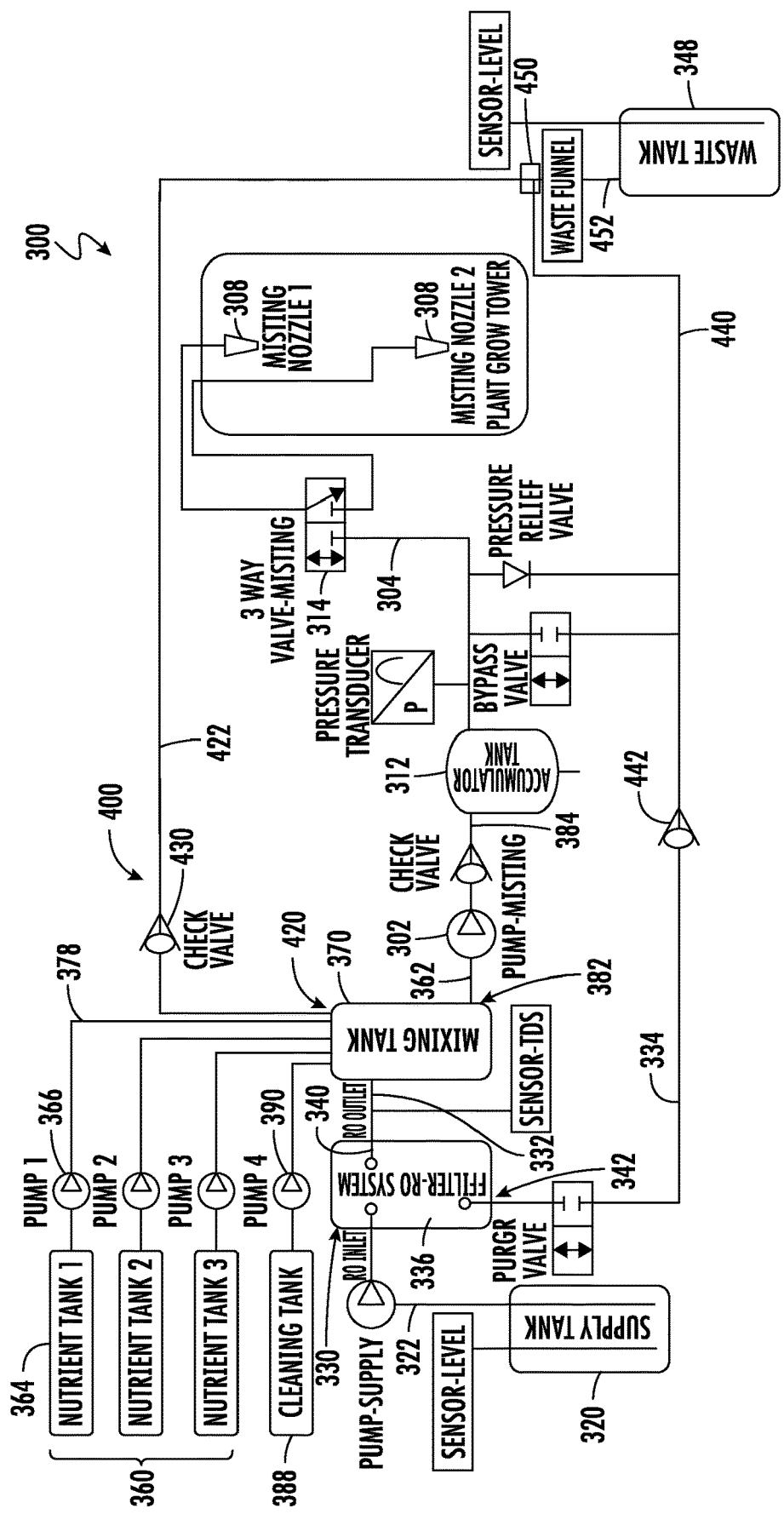
FIG. 14 is a system schematic of the exemplary hydration system of FIG. 11.

According to exemplary embodiments, hydration system 300 may further include one or more valves positioned throughout hydration system 300 for regulating the flow of nutrient mixture or other fluid flows therein. For example, as illustrated in FIG. 14, hydration system 300 includes a discharge valve 314 that is operably coupled to supply conduit 304 or directly to discharge nozzle 308 for selectively regulating the flow of nutrient mixture. For example, according to the illustrated embodiment, discharge valve 314 is a three-way valve that is capable of directing the flow of nutrient mixture to an upper discharge nozzle 308, a lower discharge nozzle 308, or both. Although a single, three-way discharge valve 314 is illustrated as regulating the flow of nutrient mixture to all discharge nozzles 308, it should be appreciated that hydration system 300 may include a plurality of independently adjustable discharge valves that can provide the flow of nutrient mixture to specific plants according to specific hydration schedules.

According to exemplary embodiments, supply conduit 304 may be fluidly coupled to any suitable number and type of fluid supplies to provide the desired amount of liquid or liquid having the desired nutrients and characteristics into supply conduit 304. In this regard, it may frequently be desirable to provide fresh water through discharge nozzles 308. For example, fresh water may be desired in order to reduce the buildup of mildew, mold, bacteria, or to otherwise regulate nutrient levels within the nutrient mixture. Specifically, according to an exemplary embodiment, hydration system 300 includes a water supply 320 that contains fresh water (e.g., indicated generally by schematic lines 322 in FIG. 14), such as pure tap water, distilled water, or water from any other external fluid supply source. For example, water supply 320 may be a municipal water supply that provides a flow of pressurized water. According to still other embodiments, water supply 320 may include any other suitable sources of water, such as a water storage tank that may be filled by a user and that is contained within cabinet 102. It should be appreciated that water supply 320 may include any suitable pumps, flow regulating valves, or other flow regulating devices needed to regulate the flow of freshwater 322. This fresh water 322 may also be referred to herein as "untreated" water, and aspects of the present subject matter are directed to a filtration system 330, described in more detail below, for treating untreated water 322.

According to exemplary embodiments, a filtration system 330 is integrated into hydration system 300 of gardening appliance 100 that includes one or more filters that are generally configured for receiving and filtering untreated water 322 to generate treated water (e.g., indicated generally by schematic lines 332 in FIG. 14) and wastewater (e.g., indicated generally by schematic lines 334 in FIG. 14). Specifically, according to the illustrated embodiment, filtration system 330 includes a primary filter, illustrated herein as a reverse osmosis filter 336. As used herein, the term "reverse osmosis filter" is generally intended refer to any suitable number, type, and configuration of filters that implement a reverse osmosis process to remove contaminants from untreated water 322. For example, according to an exemplary embodiment, reverse osmosis filter 336 may utilize membrane or hollow fiber separation technologies, although any other suitable reverse osmosis technology may be used according to alternative embodiments. In this regard, reverse osmosis is generally the process of filtering water using a semipermeable membrane that allows fresh water to permeate from a contaminated side of the membrane, through the semipermeable membrane, and into a filtered side of the semipermeable membrane. Contaminants, e.g., dissolved solids, in untreated water 322 are not permitted to pass through the semipermeable membrane create a liquid with concentrated contaminants, referred to herein as wastewater 334. Further details regarding the reverse osmosis process are omitted here for brevity but should be understood by one of ordinary skill in the art.

According to the exemplary embodiments, filtration system 330 may further include one or more prefilters that filter untreated water 322 before passing it into reverse osmosis filter 336. For example, the prefilters may include an activated carbon filter (not shown) that reduces multiple organic compounds (VOCs), chlorine, and any other contaminants that may result in a bad taste or odor in treated water 332. It should be appreciated that any suitable number, type, and configuration of filters maybe used according to exemplary embodiments.

As illustrated, reverse osmosis filter 336 generally defines a treated water outlet 340 through which treated water 332 may be discharged and a wastewater outlet 342 through which wastewater 334 may be discharged. In addition, filtration system 330 may include a treated water conduit that is fluidly coupled to treated water outlet 340 for receiving the flow of treated water 332. Similarly, a wastewater conduit may provide fluid communication between wastewater outlet 342 and an external drain or a wastewater reservoir 348. As used herein, the terms "external drain," "wastewater reservoir," and the like are generally intended to refer to any drainage system, receptacle, or reservoir that is generally intended to receive wastewater 334 from a reverse osmosis filter 336 or any other discharged or unwanted water from hydration system 300.

For example, according to an exemplary embodiment, external drain 348 may be plumbed directly to a municipal sewage drain or wastewater treatment center. According to still other embodiments, external drain 348 may be a removable wastewater reservoir that is stored within cabinet 102 gardening appliance 100. In this regard, filtration system 330 may be designed for producing significantly less wastewater 334 than conventional filtration systems, thereby making onboard wastewater storage a practical solution. As a result, gardening appliance 100 may not need to be fluidly coupled to a permanent wastewater plumbing system or drain. Instead, the wastewater storage reservoir may be periodically emptied by a user of gardening appliance 100, e.g., by removing the wastewater storage reservoir and dumping the wastewater 334 into a sink or another drain.

According to exemplary embodiments, hydration system 300 may further include a nutrient dosing system 360 that is generally configured for facilitating the distribution of nutrient-rich liquid (e.g., indicated generally by schematic lines 362 in FIG. 14) throughout gardening appliance 100 for improved plant growth. In this regard, for example, nutrient dosing system 360 may include a nutrient supply and a mixing system that provides a flow of nutrients in the desired concentrations. Nutrient dosing system 360 may include replaceable or refillable nutrient cartridges 364 that are filled with nutrients in concentrated form or may receive a nutrient supply from any other suitable location. As used herein, the term "nutrients" and the like are intended generally to refer to any substances which facilitate improved growth of plants 124. For example, according to exemplary embodiments, nutrients may include calcium, magnesium, potassium, sulfur, copper, zinc, boron, molybdenum, iron, cobalt, manganese, phosphorous, and chlorine. Nutrients may also be used to refer to chemicals or substances that can be used to adjust a pH of the nutrient mixture, a level of total dissolved solids (TDS), etc. According to alternative embodiments, any other suitable mixture or combination of compositions for encouraging root growth and plant growth may be used while remaining within the scope of the present subject matter.

Nutrient dosing system 360 may further include features for discharging selected flow rates or volumes of nutrients, such as pumps or discharge mechanisms. According to exemplary embodiments, nutrient dosing system 360 may include a plurality of nutrient dosing pumps 366, such as solenoid-actuated plunger valves, a dedicated pump (e.g., such as a peristaltic pump), or a flow regulating valve that may selectively dispense any desired nutrients, at desired rates, and at desired times. Thus, nutrient dosing system 360 provides any suitable number, type, and combinations of nutrients at any suitable flow rates and volumes for mixing within hydration system 300.

For example, according to exemplary embodiments, nutrient dosing system 360 may include a plurality of flow regulating valves, discharge mechanisms, pumps, and supply nozzles that are all in operative communication with controller 196 of gardening appliance 100. As such, controller 196 may make informed decisions regarding the desired flow of diluted nutrient mixture based on the type, quality, and position of plants 124 within grow tower 160. For example, controller 196 may regulate the type of nutrients supplied, the nutrient concentrations, which nozzles receive the flow of diluted nutrients, etc. In addition, nutrient dosing system 360 may make other adjustments that facilitate improved plant growth and ecosystem health within gardening appliance 100.

According to the illustrated embodiment, hydration system 300 may further include a mixing tank 370 that is generally configured for receiving treated water 332 from reverse osmosis filter 336 along with nutrients from nutrient dosing system 360. Mixing tank 370 may include any suitable agitators, stirrers, or other devices for creating a nutrient mixture 362 out of nutrients and treated water 332. As best illustrated in FIGS. 11 through 14, mixing tank 370 generally includes an internal mixing reservoir 372 that receives water and nutrients to create nutrient mixture 362. In addition, mixing tank 370 may generally define a water inlet 374 that is fluidly coupled to water supply 320, e.g., via treated water outlet 340 from reverse osmosis filter 336. In this manner, treated water 332 may be supplied through water inlet 374 into internal reservoir 372.

In addition, mixing tank 370 may define one or more nutrient inlets 376 that are operably coupled with nutrient dosing system 360 for receiving one or more nutrients or other additives into internal mixing reservoir 372. Specifically, a nutrient supply conduit 378 may extend between each nutrient cartridge 364 or the associated nutrient dosing pump 366 and their respective nutrient inlets 376 on a top plate 380 of mixing tank 370. As explained briefly above, controller 196 of gardening appliance 100 may independently regulate nutrient dosing pumps 366 to provide the desired amount and concentration of nutrients from each nutrient cartridge 364 and through each nutrient inlet 376.

Mixing tank 370 may further define a mixture outlet 382 that is also defined on the top plate 380 mixing tank 370 and which is fluidly coupled discharge nozzles 308. More specifically, according to the illustrated embodiment, pump assembly 302 may be fluidly coupled to mixture outlet 382 via a mixture supply line 384 and may also be fluidly coupled to discharge nozzles 308. In this manner, pump assembly 302 may selectively operate to urge a flow of nutrient mixture 362 from mixing tank 370, out mixture outlet 382, and through mixture supply line 384 to one or more discharge nozzles 308. As also noted above, hydration system 300 may include one or more discharge valves 308 for selectively regulating the flow of nutrient mixture 362 to each respective discharge nozzle 308.

Figure 8:
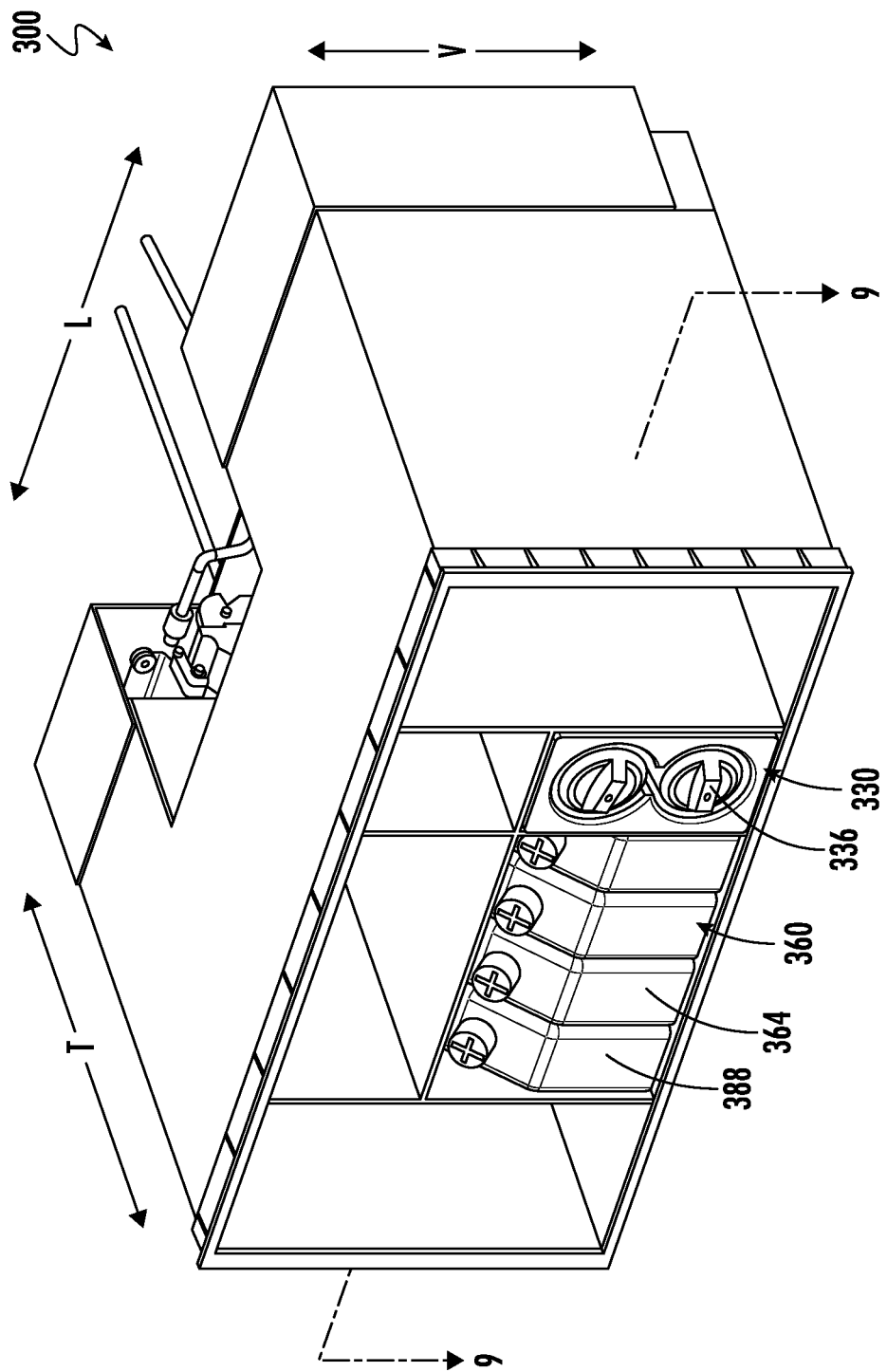
FIG. 8 is a front, perspective view of a hydration system that may be used with the exemplary gardening appliance of FIG. 1 according to an exemplary embodiment of the present subject matter.
Figure 9:
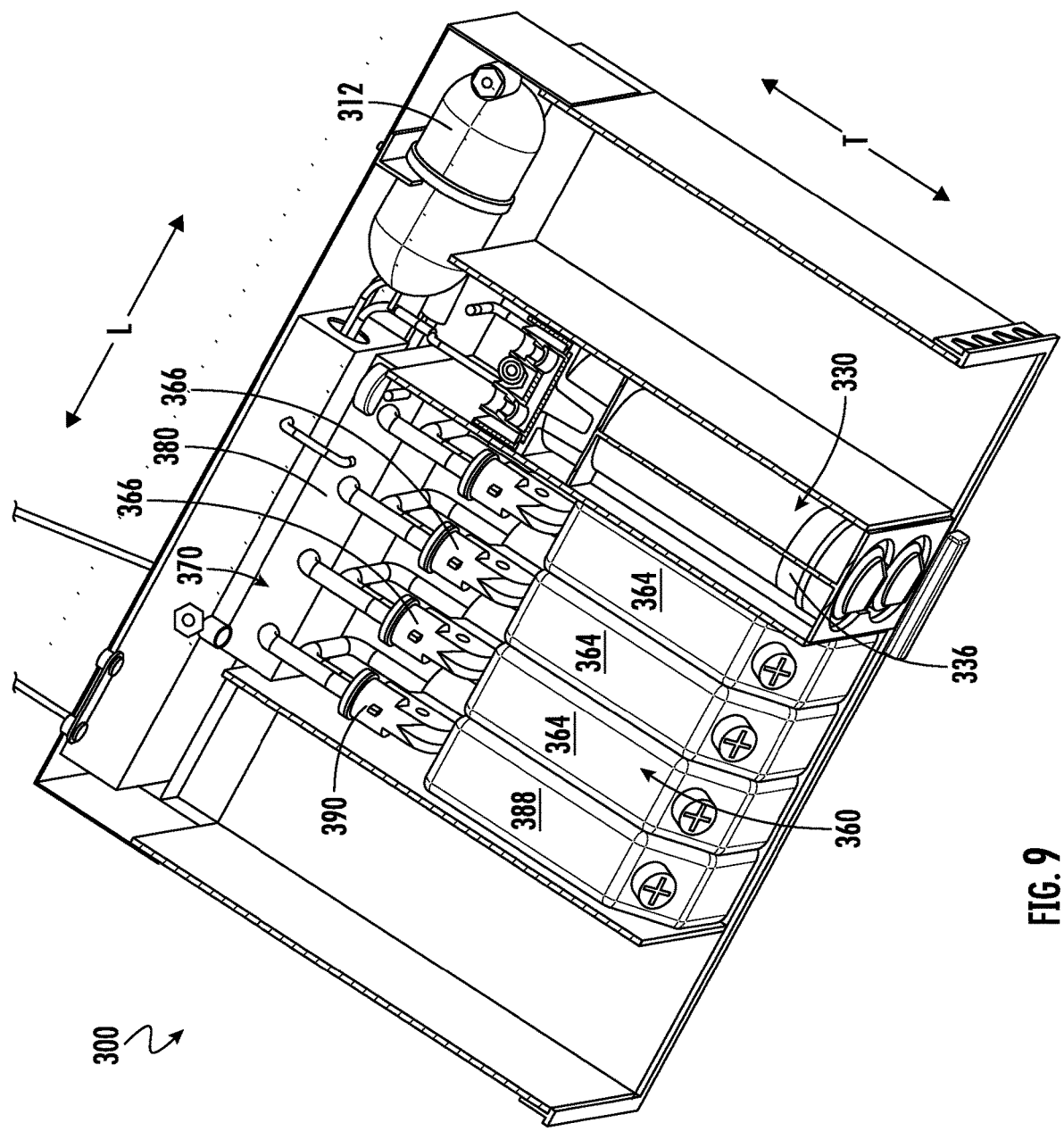
FIG. 9 is a cross-sectional view of the exemplary hydration system of FIG. 8, taken along Line 9-9 from FIG. 8.
Figure 10:
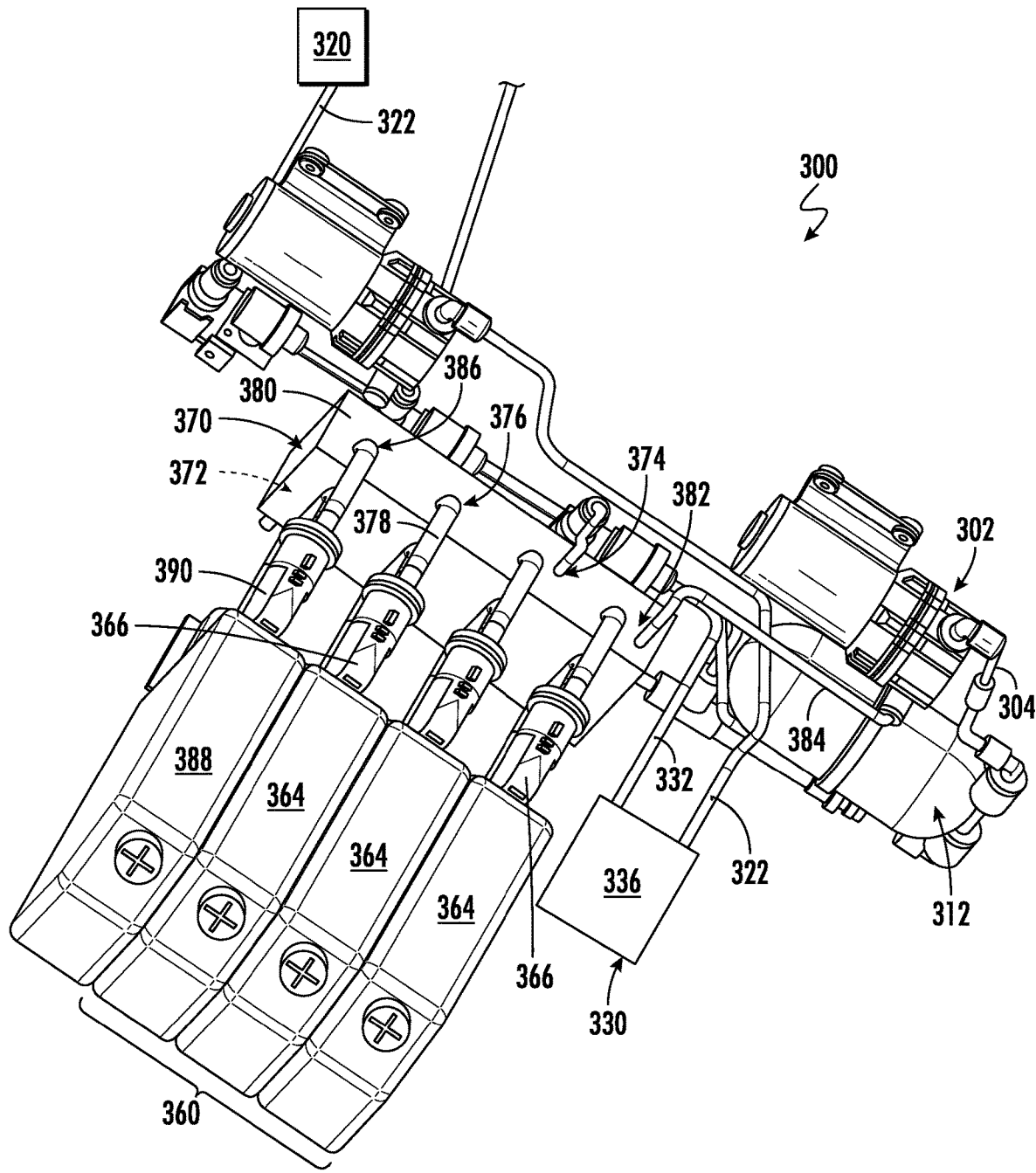
FIG. 10 is a perspective view of the exemplary hydration system of FIG. 8 with cabinetry components removed for clarity.
Figure 11:
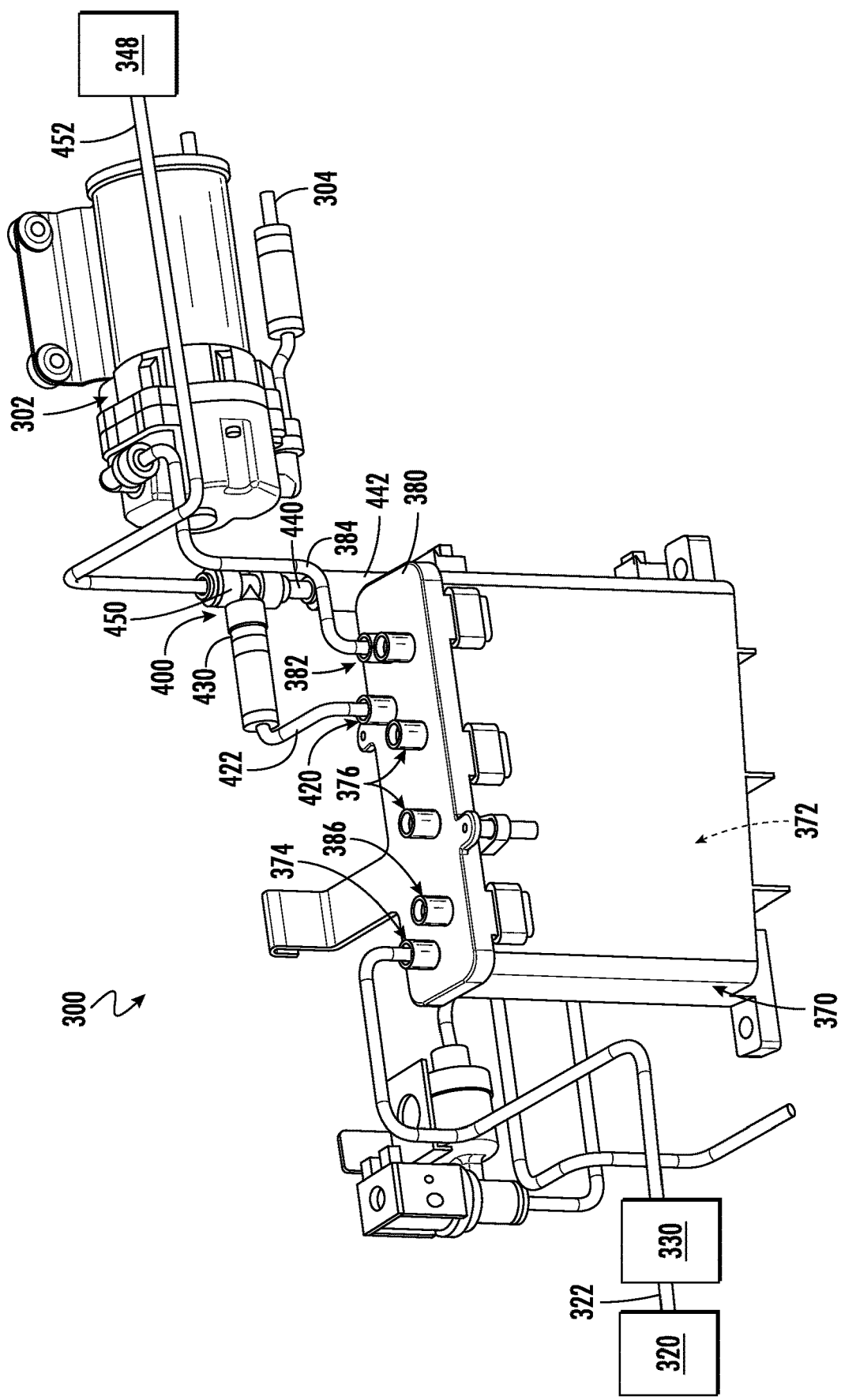
FIG. 11 is a front, perspective view of a hydration system that may be used with the exemplary gardening appliance of FIG. 1 with certain components removed for clarity.

Notably, it may be commonly desirable to perform a cleaning operation of hydration system 300 and/or gardening appliance 100. Accordingly, mixing tank 370 may further define a cleaning solution inlet 386 that may be fluidly coupled to a cleaning supply. For example, as shown in FIG. 8, a cleaning supply cartridge 388 may be positioned adjacent nutrient cartridges 364 and may be similarly supplied with a cleaning solution pump 390 for selectively discharging cleaning solution into mixing tank 370. In this manner, hydration system 300 may be periodically flushed with cleaning solution and that cleaning solution may be sprayed into gardening appliance if desired or purged directly to wastewater reservoir 348 downstream of pump assembly 302.

Notably, as explained briefly above, clogs and/or flow restrictions may be commonly generated downstream of mixing tank 370. For example, the buildup of plant material, nutrients, mold, mildew, etc. may clog one or more discharge nozzles 308. When this occurs, less fluid is discharged from hydration system 300 and excess liquid and pressures may build up within mixing tank 370. Water supply 320 and nutrient dosing system 360 may be unaware of the increased pressures and may thus continue to supply additional liquids into mixing tank 370. These additional liquids may generate an increase in pressure and may result in leaks that may damage floors, furniture, etc. Accordingly, aspects of the present subject matter are generally directed to overflow protection systems 400 that are operably coupled to mixing tank 370 to prevent such conditions.

For example, referring briefly to FIG. 14, the primary means for detecting liquid levels within mixing tank 370 may include a liquid level sensing assembly 402 that is operably coupled to mixing tank 370. As shown, liquid level sensing assembly 402 may include a float 404 that is slidably positioned within mixing tank 370, e.g., within a float chamber 406. Float chamber 406 may extend along the vertical direction V and make permit float 404 to rise and lower with the liquid level within internal mixing reservoir 372. Liquid level sensing assembly 402 may further include one or more Hall-effect sensors 408 or any other suitable sensor for detecting the position of proximity of float 404. As shown, float 404 is in the lowered position, e.g., by a lower Hall-effect sensor 408. However, as mixing tank 370 is filled with liquid, float 404 may rise with the liquid level until it reaches an upper Hall-effect sensor 408. When the water level reaches this level, controller 196 may operate to perform control actions that prevent over filling of mixing tank 370, such as shutting off the water supply 320, nutrient dosing system 360, etc. Float chamber 406 and mixing tank 370 may include additional features that ensure that float 404 does not become jammed or bind up during operation, e.g., such as low friction ribs, position stops at the top and bottom, etc.

Notably, in the event the liquid level sensing assembly 402 fails, the water supply 320 provides too much water, the nutrient dosing system 360 provides too many nutrients, or the mixing tank 370 is overfilled for any other reason, overflow protection system 400 may include an additional failsafe to prevent leaks or damage of gardening appliance 100. In this regard, top plate 380 of mixing tank 370 may further define an overflow port 420. An overflow conduit 422 may be fluidly coupled to overflow port 420 and may provide fluid communication between overflow port 420 and an external drain or wastewater reservoir 348. In this manner, if the water within mixing tank 370 exceeds the high-level mark and continues to rise, this excess liquid may be discharged through overflow conduit 422 into external drain 348.

More specifically, as best shown in FIG. 14, overflow port 420 may include a dip tube 424 that extends down into mixing tank 370 below a maximum liquid level e.g., as identified in FIG. 14 by reference numeral 426. By contrast, it should be appreciated that nutrient inlets 376 and cleaning solution inlet 386 may all be positioned above the maximum fill line 426. In this manner, as the liquid within mixing tank 370 rises above the max fill line 426, this liquid will first be discharged through dip tube 424 and out overflow conduit 422 before contaminating the cleaning supply cartridges 388 or the nutrient dosing system 360.

According to the illustrated embodiment, overflow protection system 400 may further include a one-way overflow valve 430 that is positioned on the overflow conduit 422 downstream of overflow port 420 in order to prevent liquid from flowing back into mixing tank 370. It should be appreciated that one-way overflow valve 430 may include a breaking or cracking pressure after which the liquid within mixing tank 370 begins flowing out of mixing tank 370 through overflow conduit 422. For example, according to exemplary embodiments, the cracking pressure of one-way overflow valve 430 may be between about 0.05 and 1 pounds per square inch (psi), between about 0.1 and 0.5 psi, between about 0.2 and 0.4 psi, or about 0.3 psi.

Figure 12:
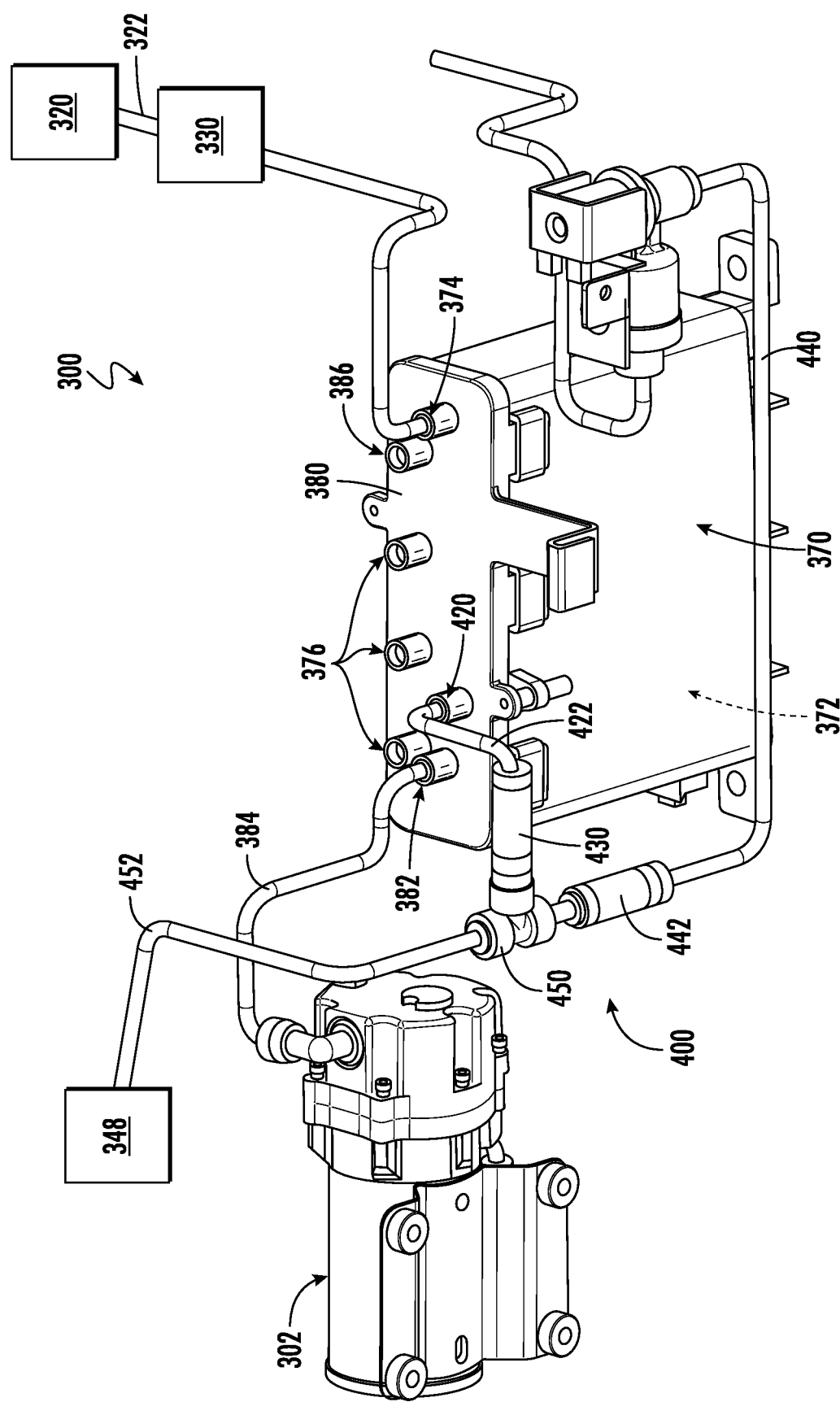
FIG. 12 is a perspective view of the exemplary hydration system of FIG. 11 with certain components removed for clarity.
Figure 13:
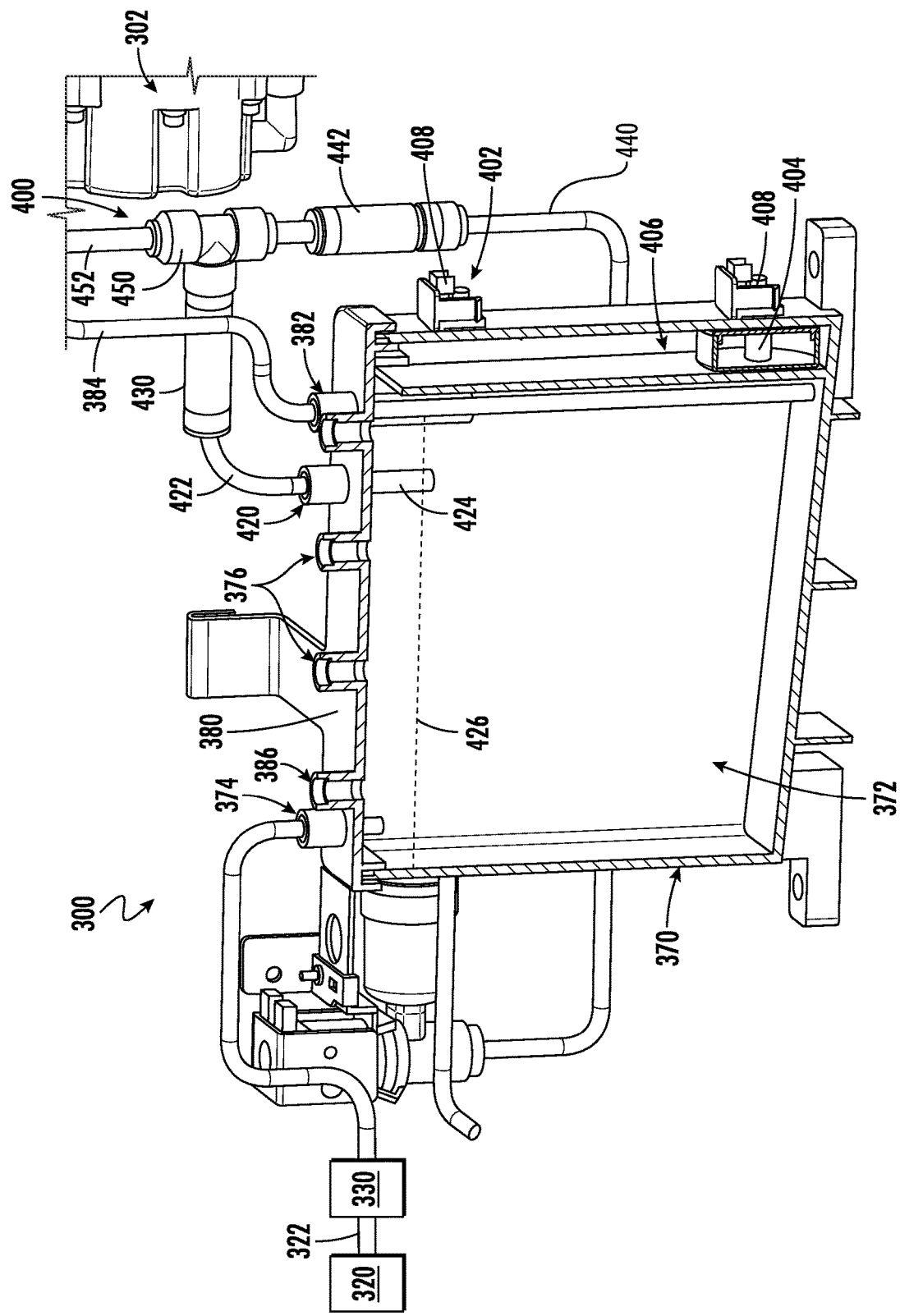
FIG. 13 is a cross-sectional, perspective view of a mixing tank of the exemplary hydration system of FIG. 11.

As best shown in FIG. 12, hydration system 300 may further include a purge conduit 440 that is fluidly coupled to overflow conduit 422 and reverse osmosis filter 336 to pass a flow of purge liquid to external drain 348. In this regard, reverse osmosis filter 348 may be periodically purged with liquid to refresh the filter and remove built up particulates or contaminants. This flow of purge liquid should be discharged to external drain 348 through purge conduit 440. According to the illustrated embodiment, overflow protection system 400 may further include a one-way purge valve 442 that is positioned on the purge conduit 440 downstream of reverse osmosis filter 336 in order to prevent liquid from flowing back into reverse osmosis filter 336.

More specifically, according to the illustrated embodiment, hydration system 300 may further include a tee valve 450 that is coupled both overflow conduit 422 and purge conduit 440 to a wastewater conduit 452. In this manner, the flow of purge liquid from reverse osmosis filter 336 and the flow of overflow liquid from mixing tank 370 may flow through the same wastewater conduit 452 into external drain or the wastewater reservoir 348, eliminating the need for separate plumbing lines.

As explained above, aspects of the present subject matter are generally directed to a hydration system including a nutrient mixing tank having an overflow protection system that may be used in any suitable aeroponics, hydroponics, or aquaponics garden center. For example, the nutrition mixing tank may include an overflow tube with an integrated overflow protection mechanism (e.g., a check valve), a reverse osmosis purge system, a cleaning solution supply port, a plurality of nutrient inlet ports, a water inlet port, and a float sensor liquid level detection system.

The float sensor assembly may be used to monitor the liquid level in the mixing tank and a clip may be used to hold the sensor in place. The float sensor assembly may include a float that will be at tank bottom when the mixing tank is empty and that rises to top when the mixing tank is full. In the top of the mixing tank cover there may be a protection tab to prevent the float from overshooting and going above this level. For example, this may stop fault signaling or false triggers of the float sensor assembly. In addition, the float sensor assembly may include a plurality of seals to stop the leakage and there may be vertically-extending contact tabs or ribs that minimize float friction to avoid the float from sticking to the mixing tank and avoiding sensor failures. If the float sensor indicates that the liquid level in the mixing tank exceeds a predetermined upper limit, the nutrient dosing pumps, water supply pumps, cleaning solution pumps, etc. may all be turned off to prevent potential overfilling and/or leaks.

In the event that the float sensor becomes stuck or otherwise fails to detect or communicate excessive liquid levels, the overflow protection mechanism may be triggered. For example, if the tank is over filled, the liquid therein may start moving through the overflow protection system to a waste tank or a drainage system. The system may include one or more check valves or non-return valves to stop the flow of solution in opposite direction. If water and nutrient solution starts flowing over the maximum level and if the check valve reaches the lower pressure limit or the set pressure level (i.e., the cracking pressure), then the non-return valve opens and allows the extra solution to escape from the mixing tank to waste tank or drainage system. This stops the overflowing of nutrient and water solution in the mixing tank and protects the wood floors or carpets and other nearby items. The overflow tube may be placed under the maximum water level, where the nutrient solution can reach up to this level. In addition, the cleaning solution and nutrient supply ports may be arranged above the solution maximum level in the mixing tank to stop the overflowing into the cleaning and nutrient systems respectively and prevent further leakage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance defining a vertical direction, the gardening appliance comprising:
    a liner positioned within a cabinet and defining a grow chamber;
    a turntable rotatably mounted within the cabinet;
    a grow tower positioned on the turntable and being rotatable about a central axis, the grow tower defining a root chamber and a plurality of apertures for receiving one or more plant pods;
    a mixing tank for making a nutrient mixture, the mixing tank defining a water inlet, a nutrient inlet, and a mixture outlet, the nutrient mixture comprising at least one of water or nutrients; and
    an overflow protection system operably coupled to the mixing tank, the overflow protection system comprising:
        a wastewater reservoir;
        an overflow port fluidly coupled to the mixing tank;
        an overflow conduit providing fluid communication between the overflow port and the wastewater reservoir; and
        a one-way overflow valve fluidly coupled to the overflow conduit to prevent liquid flow back into the mixing tank.

2. The gardening appliance of claim 1, further comprising:
    one or more discharge nozzles positioned within the root chamber; and
    a pump assembly fluidly coupled to the mixture outlet for urging the nutrient mixture from the mixing tank into the one or more discharge nozzles.

3. The gardening appliance of claim 2, further comprising:
    a three-way valve that fluidly couples the pump assembly to the one or more discharge nozzles to selectively direct the nutrient mixture to the one or more discharge nozzles.

4. The gardening appliance of claim 1, further comprising:
    a water supply for providing a flow of water into the mixing tank.

5. The gardening appliance of claim 4, wherein the water supply provides untreated water, the gardening appliance further comprising:
    a reverse osmosis filter fluidly coupled to the water supply for filtering the untreated water to create treated water that is supplied into the mixing tank through the water inlet.

6. The gardening appliance of claim 5, further comprising:
    a purge conduit that is fluidly coupled to the overflow conduit and the reverse osmosis filter to pass a flow of purge liquid to the wastewater reservoir.

7. The gardening appliance of claim 6, further comprising:
    a one-way purge valve fluidly coupled to the purge conduit to prevent the flow of purge liquid back into the reverse osmosis filter.

8. The gardening appliance of claim 7, wherein the overflow conduit and the purge conduit are fluidly coupled to a wastewater conduit through a tee valve.

9. The gardening appliance of claim 4, wherein the water supply comprises a municipal water supply or an untreated water reservoir.

10. The gardening appliance of claim 1, wherein the overflow port comprises a tube that extends down into the mixing tank below a maximum liquid level along the vertical direction.

11. The gardening appliance of claim 1, wherein the mixing tank further defines a cleaning solution inlet configured for receiving a cleaning solution.

12. The gardening appliance of claim 1, wherein the mixing tank defines a plurality of nutrient inlets, the gardening appliance further comprising:
    a nutrient dosing system comprising a plurality of nutrient cartridges fluidly coupled to the mixing tank through the plurality of nutrient inlets for selectively adding nutrients to the mixing tank for creating a nutrient mixture within the mixing tank.

13. The gardening appliance of claim 1, further comprising:
    a liquid level sensing assembly operably coupled to the mixing tank, the liquid level sensing assembly comprising:
    a float slidably mounted within the mixing tank; and
    a high-level sensor for detecting when the nutrient mixture in the mixing tank has raised the float to a predetermined height.

14. The gardening appliance of claim 1, wherein the one-way overflow valve has a cracking pressure of between about 0.1 and 0.5 pounds per square inch.

15. The gardening appliance of claim 1, wherein the wastewater reservoir comprises an external drain or a removable wastewater tank that is stored within the gardening appliance.

16. A hydration system for a gardening appliance, the gardening appliance comprising a liner positioned within a cabinet and defining a grow chamber, a turntable rotatably mounted within the cabinet, and a grow tower positioned on the turntable and being rotatable about a central axis and defining a root chamber, the hydration system comprising:
   one or more discharge nozzles positioned within the root chamber;
   a mixing tank for making a nutrient mixture, the mixing tank defining a water inlet, a plurality of nutrient inlets, and a mixture outlet;
   a water supply for providing a flow of water into the mixing tank;
   a nutrient dosing system comprising a plurality of nutrient cartridges fluidly coupled to the mixing tank through the plurality of nutrient inlets;
   a pump assembly fluidly coupled to the mixture outlet for urging the nutrient mixture from the mixing tank into the one or more discharge nozzles; and
   an overflow protection system operably coupled to the mixing tank, the overflow protection system comprising:
      a wastewater reservoir;
      an overflow port fluidly coupled to the mixing tank;
      an overflow conduit providing fluid communication between the overflow port and the wastewater reservoir; and
      a one-way overflow valve fluidly coupled to the overflow conduit to prevent liquid flow back into the mixing tank.

17. The hydration system of claim 16, further comprising:
   a three-way valve that fluidly couples the pump assembly to the one or more discharge nozzles to selectively direct the nutrient mixture to the one or more discharge nozzles.

18. The hydration system of claim 16, wherein the water supply provides untreated water, the hydration system further comprising:
   a reverse osmosis filter fluidly coupled to the water supply for filtering the untreated water to create treated water that is supplied into the mixing tank through the water inlet; and
   a purge conduit that is fluidly coupled to the overflow conduit and the reverse osmosis filter to pass a flow of purge liquid to the wastewater reservoir.

19. The hydration system of claim 18, further comprising:
   a one-way purge valve fluidly coupled to the purge conduit to prevent the flow of purge liquid back into the reverse osmosis filter.

20. The hydration system of claim 18, wherein the overflow conduit and the purge conduit are fluidly coupled to a wastewater conduit through a tee valve.

* * * * *